United States Patent
Jin et al.

(10) Patent No.: US 7,912,463 B2
(45) Date of Patent: Mar. 22, 2011

(54) METHOD OF USING SNR TO REDUCE FACTORY TEST TIME

(75) Inventors: Xin Jin, Ottawa (CA); Jennifer Mallalieu, Ottawa (CA); Qingzhong Jiao, Nepean (CA); Ronald Bruce Harding, Waterloo (CA)

(73) Assignee: Research In Motion Limited, Waterloo (CA)

( * ) Notice: Subject to any disclaimer, the term of this patent is extended or adjusted under 35 U.S.C. 154(b) by 100 days.

(21) Appl. No.: 12/354,248

(22) Filed: Jan. 15, 2009

(65) Prior Publication Data

US 2009/0124252 A1 May 14, 2009

Related U.S. Application Data

(63) Continuation of application No. 11/066,240, filed on Feb. 25, 2005, now Pat. No. 7,542,764.

(51) Int. Cl.
H04W 24/00 (2009.01)
(52) U.S. Cl. .................. 455/425; 455/226.1; 455/115.1; 455/557
(58) Field of Classification Search .......... 455/423–425, 455/557, 115.1–115.4, 226.1–226.4
See application file for complete search history.

(56) References Cited

U.S. PATENT DOCUMENTS

| | | | |
|---|---|---|---|
| 5,020,135 A | 5/1991 | Kasparian et al. | |
| 5,475,871 A | 12/1995 | Shalev et al. | |
| 5,513,214 A | 4/1996 | Gozzo | |
| 7,099,299 B2 | 8/2006 | Liang et al. | |
| 7,149,258 B2 | 12/2006 | Nisson et al. | |
| 7,155,171 B2 | 12/2006 | Ebert et al. | |
| 7,218,894 B2 | 5/2007 | Schmidl et al. | |
| 7,286,802 B2 | 10/2007 | Beyme et al. | |
| 7,359,701 B2 * | 4/2008 | Zhao et al. | 455/423 |
| 2001/0026150 A1 * | 10/2001 | Klenner | 324/76.26 |

OTHER PUBLICATIONS

Ali-Ahmad, "The CDMA receiver system in an IS-98-A standard", Electronics Engineer, Jul. 2000, pp. 1-5.
Maxim Integrated Products, "The effect of CDMA-Receiver . . . RF Systems", Telecommunications Industry Association/Electronic Industries Association, Sep. 2000, pp. 1-14.
Rhode et al., "FER Measurements on CDMA mobile radios with AWGN and Fading", Jul. 1998, Germany, pp. 1-8.
The Defense Advanced Research Projects Agency (DARPA) Networking in Extreme Environments (NETEX) Program, Mater Plan for Netex Program, retrieved from internet on Aug. 15, 2005, pp. 1-35.

(Continued)

Primary Examiner — Edward Urban
Assistant Examiner — Christian A Hannon
(74) Attorney, Agent, or Firm — Mukundan Chakrapani; Borden Lardner Gervais LLP

(57) ABSTRACT

The application relates to wireless networks and more particularly to a method of reducing factory test time of receiver sensitivity in a Code Division Multiple Access (CDMA) wireless device. Under TIA/EIA/-98E, the radio frequency (RF) sensitivity of a CDMA wireless receiver is the minimum received power, measured at the mobile station antenna connector, at which the frame error rate (FER) does not exceed 0.5% with 95% confidence. In order to reduce the test time of FER test method, the relation between correlated energy (or Ec/Io) and FER is determined using simulated traffic and the correlated energy (or Ec/Io) measurement is then used as the test parameter on like models to achieve the same or superior test confidence with significantly reduced test time.

35 Claims, 13 Drawing Sheets

OTHER PUBLICATIONS

Agilent Technologies, "WLAN Wireless Test Benches", retrieved from the internet on Sep. 2004, XP002333379.

Anritsu Corp., Patent Abstracts of Japan, Dec. 5, 2003, vol. 2003, No. 12,& JP 2004023755.

3rd Generation Partnership Project 2 "3GPP2", "Recommended Minimum Performance Standards for cdma2000 Spread Spectrum Base Stations", retrieved from the internet Jan. 14, 2005.

* cited by examiner

| PARAMETER | UNITS | TEST 1 | TEST 2 |
|---|---|---|---|
| Ior | dBm/1.23 MHz | −104 | −25 |
| (Pilot Ec)/Ior | dB | −7 | −7 |
| (Traffic Ec)/Ior | dB | −15.6 (RC 1 and 3)<br>−12.3 (RC 2)<br>−20.6 (RC 7) | |

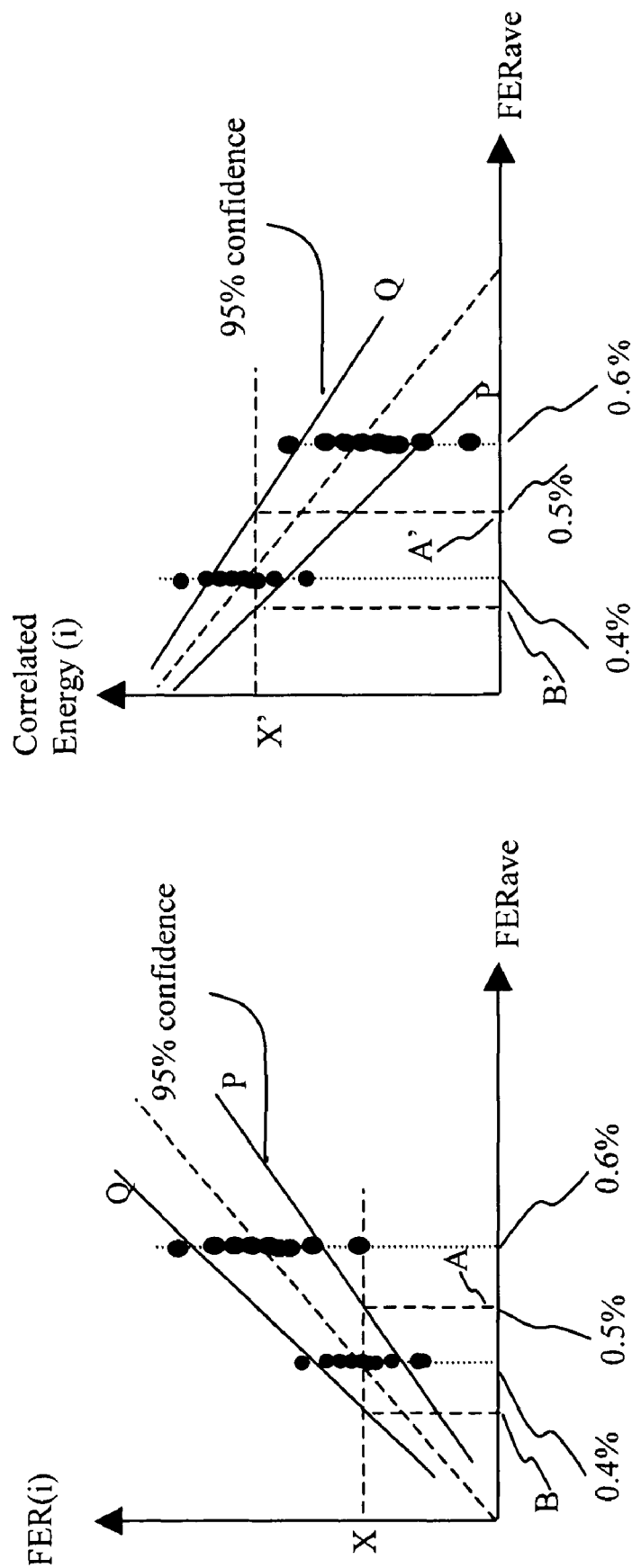

| Iteration | Samples taken | Total number of Energy Readings | Incremental test time | Total Test Time (including settling time) | Pass Criterion |
|---|---|---|---|---|---|
| 0 | | | 1.5 sec (energy settling time) | 1.5 sec | |
| 1 | $N_1$ | $N_1$ | 1 | 2.5 sec | $E_{ave} \geq 1385$ |
| 2 | $N_1$ | $2N_1$ | 1 | 3.5 sec | $E_{ave} \geq 1375$ |
| 3 | $2N_1$ | $4N_1$ | 2 | 5.5 sec | $E_{ave} \geq 1360$ |
| 4 | $4N_1$ | $8N_1$ | 4 | 9.5 sec | $E_{ave} \geq 1348$ |
| 5 | $8N_1$ | $16N_1$ | 8 | 17.5 sec | $E_{ave} \geq 1333$ |

METHOD OF USING SNR TO REDUCE FACTORY TEST TIME

This application is a continuation application from U.S. application Ser. No. 11/066,240 filed Feb. 25, 2005.

BACKGROUND OF THE INVENTION

1. Field of Invention

The application relates to wireless networks and more particularly to a method of reducing factory test time of receiver sensitivity of a wireless device, such as a Code Division Multiple Access (CDMA) wireless device.

2. Description of the Related Prior Art

As shown in FIG. 1, the delivery end of a typical mobile communication system 100 is divided into a number of cells 110 or geographical coverage areas, within each of which is a base station 120. Alternately, base station 120 for a number of cells 110 is co-located at the intersection of those cells and directional antennas are used to provide coverage over the area of each adjacent cell. Each base station 120 contains radio transmission and reception equipment for communicating with a wireless device 130, such as mobile phone, laptop, personal digital assistant (PDA) or the like, located within the associated cell 110. The coverage area of a given cell 110 is dependent upon a number of factors such as transmit/receive capabilities of the base station 120 and/or wireless device 130, the antenna (not shown) of base station 120, and the topology of the area. Specific radio frequencies are allocated with each cell 110. In a CDMA wireless network, the same frequency is reused in every cell. Each base station 120 connects to a backbone infrastructure (not shown) which perform a variety of functions such as the set up and tear down of call and the handoff of calls from one base station 120 to another.

FIG. 2 depicts a representative CDMA receiver block 200 for wireless device 130. Antenna 210 receives radio frequency signal 220 from base station 120 and converts it into a current on a conductor. The signal is very weak from absorption so, after passing through duplexer 230 (which simply permits a single antenna system to be used for both transmitting and receiving) the signal is amplified in low noise amplifier (LNA) 240. The signal is then passed through filter 250 to eliminate out-of-band noise and interference. In order to recover the original information signal from the modulated radio frequency signal 220, the signal is sent through mixer 260 which is fed by local oscillator (LO) 270 at the same frequency as the one in the transmitter (not shown) of base station 120 if, as shown in FIG. 2, zero intermediate frequency (IF) technology is used. Alternatively, there may be more than one mixer 260 to mix the received signal 220 down to at least one non-zero intermediate frequency and then down to a baseband signal by multiple steps. Out of the mixer 260 come two frequency signals (sum and difference). One of the frequencies is the intermediate frequency, the other is eliminated by filter 280. The resulting signal is amplified by amplifier 290, and passed through analog to digital converter 300 for digital processing in baseband processor 310 which may include a RAKE receiver. As those skilled in the art will appreciate, wireless device 130 is a transceiver in that it incorporates both transmitter (Tx) and receiver (Rx) functionality (e.g. the power amplifier (PA) associated with the transmitter is shown in FIG. 2). As will also be appreciated, the signal processing system of wireless device 130 may be comprised of multiple analog and mixed signal integrated circuit (IC) chips (such as amplifiers, filters, A/D and D/A converters), digital IC chips (such as memory, digital signal processors (DSP), and microprocessors) and many passive discrete components.

Quality assurance measures at the factory level ensure that wireless device 130 operates satisfactorily. Various standards have been developed against which wireless device 130 is measured. One such standard is a Telecommunications Industry Association/Electronic Industries Association standard, TIA/EIA/-98E, which defines recommended minimum performance standards for cdma2000 spread spectrum mobile stations. More specifically, a test is established in this standard for receiver sensitivity and dynamic range. The radio frequency (RF) sensitivity of a cdma2000 mobile station receiver is the minimum received power, measured at the mobile station antenna connector, at which the frame error rate (FER) does not exceed 0.5% with 95% confidence. In CDMA systems, the frame is the basic physical channel data packet, typically having a 20 ms transmission time that consists of information on the traffic channel (voice or data). Because the link between base station and handset is established on a frame-by-frame basis the performance of a CDMA mobile phone is evaluated in terms of its FER. Regarding receiver sensitivity, two sources of interference are purely additive white Gaussian noise (AWGN): the receiver's input-referred thermal noise power spectral density ($N_o$) and the transmitter's thermal noise power spectral density ($N_{Tx}$) in the receiver frequency band (see FIG. 2). A typical sensitivity and dynamic range test setup using FER is shown in FIG. 3A while the associated test parameters as defined in TIA/EIA/-98E are shown in FIG. 3B. A sensitivity test (test 1) ensures the receiver's ability to receive weak signals, and a dynamic range test (test 2) ensures the receiver's ability to receive a strong signal. In FIG. 3A, the base station 120 is simulated using a piece of test equipment 320, such as the Agilent 8960 wireless communications test set, which feeds a test signal to an antenna port of a device under test (DUT) 330. As highlighted in FIG. 3B, a typical test, at 9600 bps (RC 1 and 3) or 14400 bps (RC 2) data rate, consists of setting the test parameters of Test 1 or Test 2, and counting the number of frames transmitted at the base station and comparing it to the number of erroneous frames received at the mobile station.

One of the problems with the TIA/EIA/-98E receiver sensitivity test is that the test time is too long for mass production, being physically restricted by the arrival rate of the frames at DUT 330. In an attempt to reduce the test time, the maximum number of frames for the sensitivity test is limited to no more than 1000 (which may not always achieve the required 95% confidence level), but this method still takes up to 80 seconds for four channels at two bands. As will be appreciated, for thousands of units, the test time and associated cost in man hours may become prohibitive.

SUMMARY OF THE INVENTION

In order to overcome the deficiencies of the FER test method, there is provided an improved receiver sensitivity test. For a given model of CDMA wireless device the relation between correlated energy or SNR and FER is determined using simulated traffic and the correlated energy or SNR measurements are then used as the test parameters on like models to achieve the same or superior test confidence with significantly reduced test time. Because the test is conducted over a time-invariant AWGN, and given the fact that the digital signal processing is identical to all DUT 330 of the same type, the frame error rate is only dependent on the correlated energy or SNR at the output of A/D 300 feeding to the baseband processor 310. Baseband processor 310 of a CDMA wireless device 130 includes an Ec/Io estimator (energy per chip to interference density ratio, which is a kind of expression of SNR often used in a CDMA based system), which is borrowed for the factory test. The Ec/Io estimate is determined by a RAKE finger energy estimator (producing an output related to correlated "energy") found in baseband processor 310, and some further processing which translates the estimated correlated energy to Ec/Io. Both Ec/Io and the correlated energy are monotonic functions of frame error rate under a given channel condition, so either can be used. Since the estimator reported correlated energy (or Ec/Io) contains a certain degree of random fluctuations, its distribution and nonlinear relation with frame error rate is characterized for a given model of wireless device, to determine a set of factory test criteria that achieves a test confidence level equal or superior to the TIA/EIA/-98E receiver sensitivity test. Once the characterization is carried out, each wireless device 130 is evaluated against the established pass/fail correlated energy or Ec/Io threshold.

In accordance with a first embodiment, there is provided a method of testing receiver sensitivity in a radio frequency (RF) device comprising: (a) selecting a new test quantity to replace a known receiver sensitivity test parameter; (b) determining the relationship between the known receiver sensitivity test parameter and the new test quantity; (c) determining a new test criteria based on the new test quantity in accordance with a defined standard; and (d) conducting a receiver sensitivity test using the new test quantity and the new test criteria, wherein the new test quantity has a predetermined and monotonic relationship with the known receiver sensitivity test parameter, and wherein the new test quantity is read from a baseband processor associated with the RF device, and wherein said step of determining a new test criteria comprises: (i) obtaining a plurality of the known receiver sensitivity test parameter measurements and corresponding values of the new test quantity at each of a plurality of received signal strengths; (ii) calculating at each of the plurality of received signal strength levels an average value of the plurality of said known receiver sensitivity test parameter measurements; (iii) plotting the averages of N-sample groups of the corresponding values of the new test quantity versus the calculated average values of the plurality of the known receiver sensitivity test parameter measurements and determining targeted confidence level probability points from the plot; (iv) interpolating between the targeted confidence level probability points for different ones of the plurality of received signal strength levels; and (v) determining a pass/fail threshold for the new test quantity which corresponds to a pass/fail criteria associated with the defined test standard.

Preferably, the new test quantity is taken from the group comprising signal to noise ratio, signal to interference ratio, energy per chip to interference density ratio (Ec/Io), energy per bit to interference density ratio (Eb/Io), energy per symbol to interference density ratio (Es/Io), energy per chip to noise density ratio (Ec/No), energy per bit to noise density ration (Eb/No), energy per symbol to noise density ratio (Es/No), carrier power to noise density ratio (C/No), correlated energy, correlated amplitude, symbol error rate and bit error rate.

In accordance with a second embodiment, there is provided a system for testing receiver sensitivity in a radio frequency (RF) device comprising: (a) a wireless communications test set; (b) a device under test (DUT) communicating with the wireless communications test set, wherein a simulated traffic signal is forwarded from the wireless communications test set to the DUT, and wherein a receiver sensitivity test is conducted based on a test criteria in a accordance with a defined standard, the test criteria based on a predetermined relationship between a known receiver sensitivity test parameter and a new test quantity, and wherein the DUT comprises a baseband processor, and wherein the baseband processor comprises a channel estimator for estimating the new test quantity associated with the simulated traffic signal, and wherein the estimated new test quantity is amplitude.

Preferably, the baseband processor further includes a function for mapping a correlated energy value derived from said estimated amplitude to a signal to noise ratio (SNR) or Ec/Io.

More preferably, the wireless communications test set is connected via a coaxial cable to an antenna or radiating coupler positioned in a shielded enclosure housing the DUT, and wherein the DUT receives the simulated traffic signal via a wireless transmission from the antenna or radiating coupler, and wherein path loss associated with the wireless transmission, the coaxial cable, or the antenna or radiating coupler, is corrected by the wireless communications test set.

In accordance with a third embodiment, a modulated carrier wave generated by a wireless communication test set and received by a device under test (DUT), wherein the modulated carrier wave embodies a data signal representing a simulated traffic signal in a wireless network, and wherein a receiver sensitivity test is conducted based on a test criteria in accordance with a defined standard, and wherein the test criteria is based on a predetermined relationship between a known receiver sensitivity test parameter and a new test quantity, and wherein the new test quantity is associated with a quality level of said received modulated carrier wave, and wherein the new test quantity is determined at a digital processing portion of the DUT, and wherein the new test quantity has a predetermined and monotonic relationship with the known receiver sensitivity test parameter, and wherein the new test quantity is read from a digital baseband processor associated with the RF device.

The advantage of the described test method is now readily apparent. Using the improved testing methodology, the test time using the correlated energy or SNR technique can be reduced significantly. Test time using the FER method can span 48 to 80 seconds per device for one confidence level while using the correlated energy or SNR method can reduce the test time to a range of 10 to 22 seconds at the same confidence level.

Further features and advantages of the invention will be apparent from the detailed description which follows together with the accompanying drawings.

BRIEF DESCRIPTION OF THE DRAWINGS

A better understanding of the invention will be obtained by considering the detailed description below, with reference to the following drawings in which:

FIGS. 6A and 6B depict a plot of FER(i) v. FERave and correlated energy v. FERave along with a plot of the 95% confidence line;

FIG. 8 depicts a table listing iteration criteria used in testing a wireless device using correlated energy;

DESCRIPTION OF THE PREFERRED EMBODIMENT

The first step in the testing methodology, is the energy or SNR and FER characterization. As those in the art will appreciate, one of the main advantages of CDMA systems is the capability of using signals that arrive in the receivers with different time delays. This phenomenon is called multipath. As discussed in the background section, CDMA wireless devices may use RAKE receivers located in baseband processor 310. A RAKE receiver uses several baseband correlators to individually process several signal multipath components. Each correlator in a RAKE receiver is called a RAKE-receiver finger. One of the receivers (fingers) usually is a dedicated channel searcher which obtains course estimates of the time and amplitude of arrival of the strongest multipath components of the wireless device signal. This information is then fed to the other fingers. Each finger then demodulates the signal corresponding to a strong multipath. The results are then combined together to make the signal stronger. The square of the amplitude at the correlator output is generally referred to as the correlated energy. Baseband processor 310 also includes a function which can map the correlator output energy to a signal to interference ratio, Ec/Io, expressed in dB. For the purposes of the present description, the test methodology will be described using the correlated energy, although Ec/Io could also be used and is meant to be included within the scope of the present application.

Figure 5:
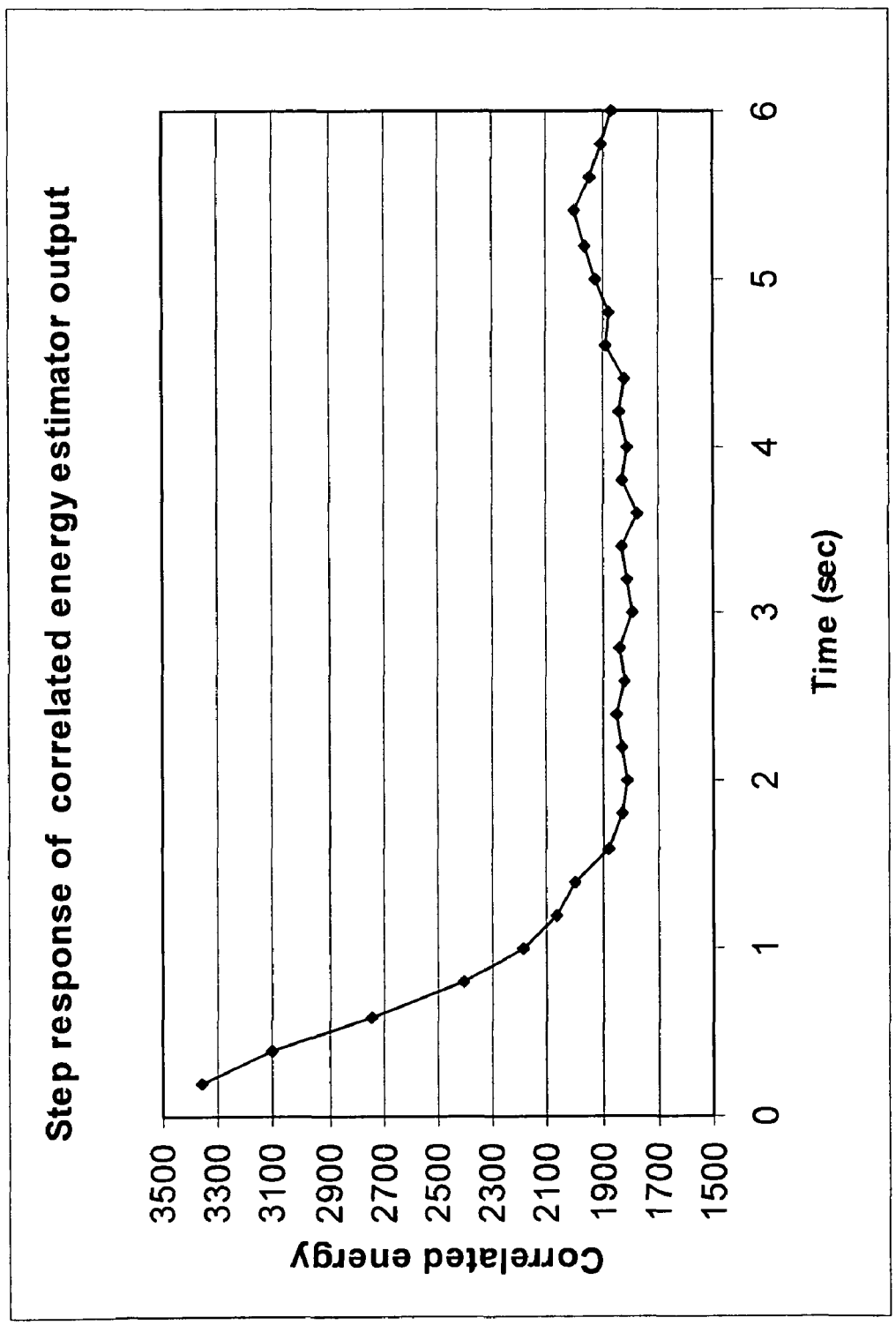
FIG. 5 depicts an energy estimator settle time chart.
Figure 7A:
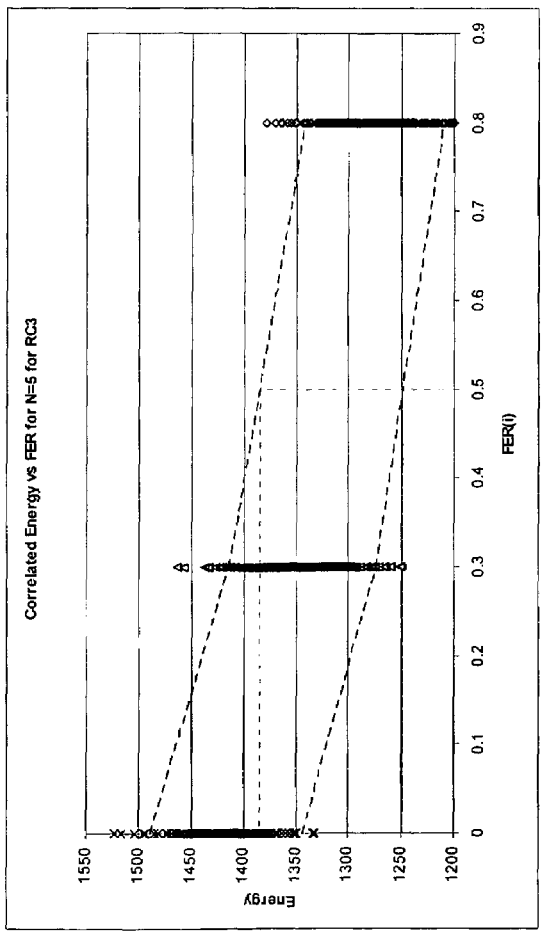
FIGS. 7A to 7E depict exemplary plots of correlated energy v. FER for sample sizes N=5, 10, 20, 40 and 80.
Figure 7B:
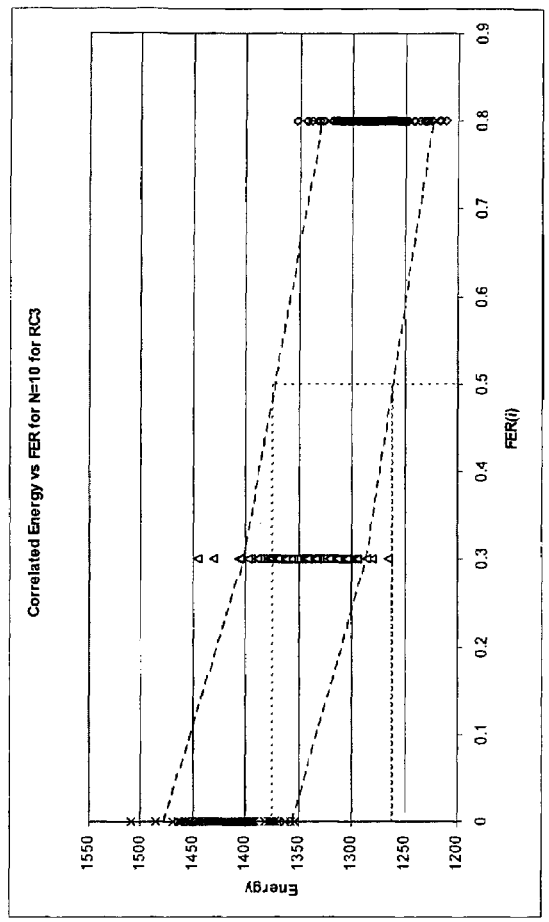
Figure 7C:
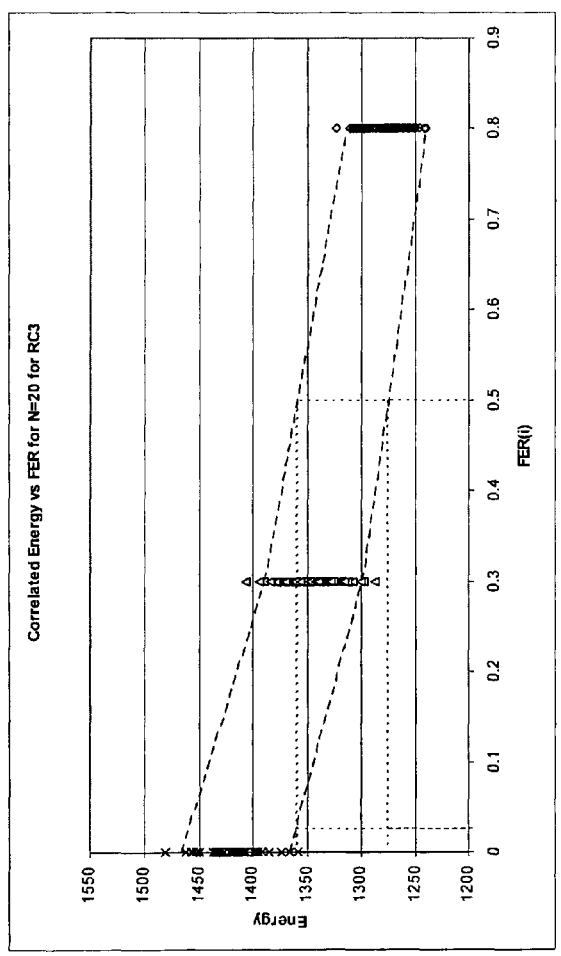
Figure 7D:
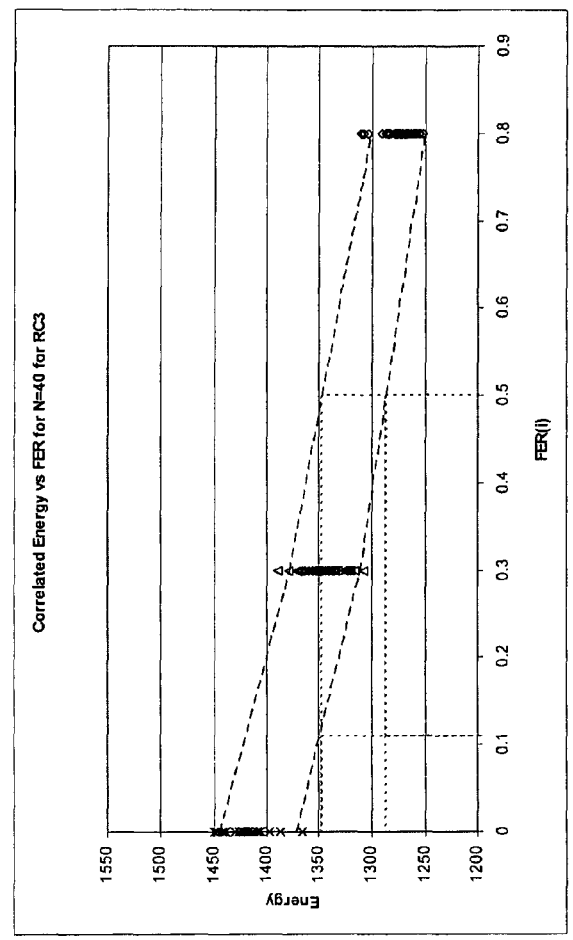
Figure 7E:
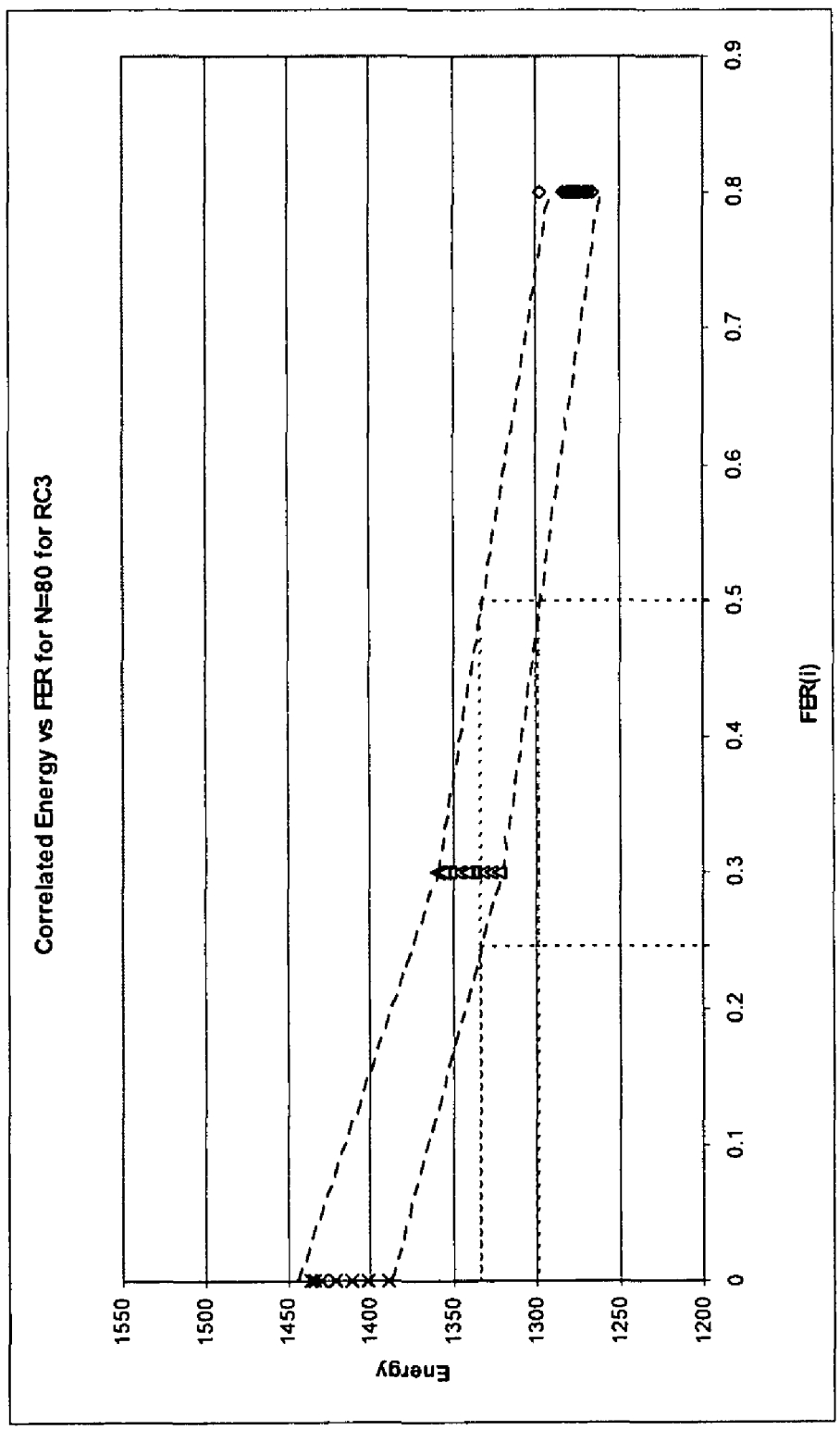

Prior to taking correlated energy readings it is necessary to determine the settling time for the correlated energy readings produced by the estimator i.e. to ensure that an erroneous transient reading is not inadvertently taken. This is accomplished by performing a test call at an arbitrarily chosen strong received signal strength (Ior) e.g. −60_dBm. An automated program is then used to set Ior to have a step decrease to a weak level around the device sensitivity, e.g. −105 dBm and an extended diagnostic monitor (XDM), a software tool well known to those skilled in the art, is used to read the correlated energy values. The frequency of reading by XDM should be chosen to be fast enough to get good time response samples e.g. five readings per second and an exemplary resulting time response for a sample device under test are shown in FIG. 5. Each point on the graph is a distinct reading of energy. The results reveal that a wait time of about 1.5 seconds is sufficient to allow for settling of the energy signal.

Figure 4:
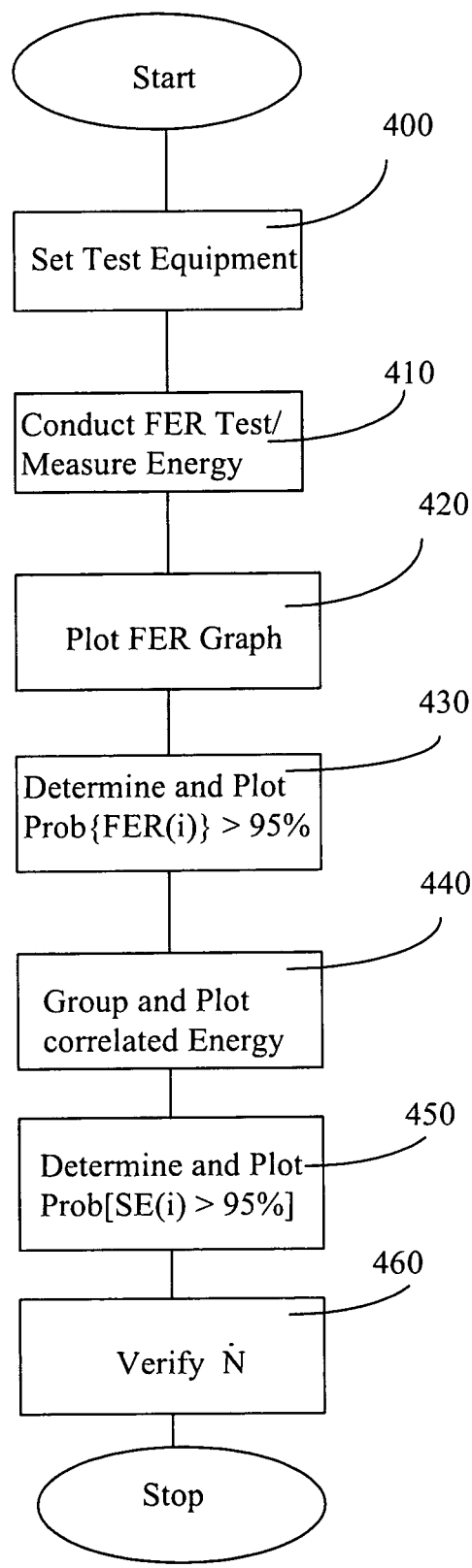
FIG. 4 depicts the steps in the characterization process whereby the relationship of correlated energy to FER is established.

FIG. 4 is a flow chart depicting the steps in the characterization process; this preparation step must be performed before the wireless device test can be conducted. The process generates a set of test parameters and criteria to be used in the test. For the characterization, two alternate objectives can be used. The first is to make the test method as reliable as an existing FER-based test in terms of false alarm rate (i.e. a good device mistakenly reported as bad), and missed detection rate (i.e. a bad device is mistakenly reported as good). The second is to make the new test compliant with the standard, which only controls the missed detection rate lower than 5% (i.e. 1-95%) and does not really care about the false alarm rate. The following describes the former embodiment and then describes the latter.

Figures 3A, 3B:
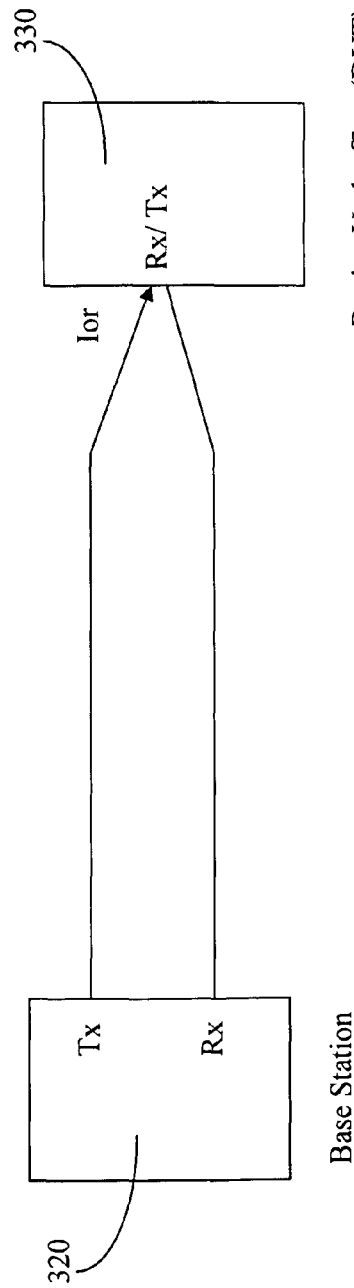
FIG. 3A depicts a standard FER hardware test setup for sensitivity and dynamic range tests.
FIG. 3B depicts a table showing the test parameters associated with a standard FER test according to TIA/EIA/-98E receiver sensitivity and dynamic range test.

At step 400, the wireless communications test set (which simulates base station 120) is configured to the same receiver sensitivity test setting as detailed in TIA/EIA/-98E (see FIG. 3B) and Ior is set, for example, in 0.5 dB steps in a FER range that covers 0.1%~1%. At step 410, a device under test (DUT) is then tested by, at each of a number of received signal strength (Ior) levels: (a) measuring the FER using the max number of frames that is used in factory e.g. 1000 frames; (b) repeating the measurement for a large number of times e.g. 20 times; (c) recording each individual FER(i) and also calculating the average FER of all the measured frames of the repeated measurement (denoted as FERave); and (d) simultaneously measuring and recording a large sample of correlated energy values for each Ior setting. At step 420, a scatter diagram of FER(i) vs. FERave is then plotted. At step 430, the 95% probability point is determined (i.e. an FER(i) value of P at which Prob[FER(i)>P]=95%, and similarly an FER(i) value of Q at which Prob[FER(i)<Q]=95%). In the calculation, if the sample size of FER(i) is not significantly large, such as 20 measurements, the variance of the 20 samples is used and Gaussian distribution is assumed to calculate the P and Q. The 95% confidence lines are then plotted on the graph by interpolating all of the P points, and all of the Q points respectively. A graph for a sample device is given in FIG. 6A. As will be appreciated by those in the art, if a measurement of 1000 frames gets a raw FER(i) reading of X, most likely the a true FER is between B and A, and the worst case with 95% confidence is A. When A is FER of 0.5%, find the range between A and B. This range will help determine the number of averages needed in new tests for achieving a sufficiently low false alarm rate. B is the point on the line of 95% on the other side i.e., the Prob[FER(i)<Q]=95%.

At step 440, the measured correlated energy samples are grouped by N=5 and the average value of each N-sample group is plotted as scatter diagram. An exemplary graph for a sample device is given in FIG. 6B. At step 450, the 95% probability point of the scatters is located, similar to step 430, i.e., Prob[correlated energy(i)>P]=95% and on the other side Prob[FER(i)<Q]=95%. The point A'=0.5% is located and the range between A' and B' is obtained. If the range B'-A' is larger than that B-A obtained in step 430, N is increased and steps 440 and 450 are repeated. Otherwise N is decreased and steps 440 and 450 are repeated. At step 460, the N value determined at step 450 is verified for a number of sample devices. The N value determined at step 450 is used to measure the average correlated energy a number of times on each of a number of sample devices (good and bad) and each of a few channels on each band of the supported bands. The corresponding FER around 0.5% is also measured with a large number of frames (e.g. 5000 or more). The overall 95% confidence result is then determined to check for consistency and the pass/fail criteria (X and X' from FIGS. 6A and 6B), for the 0.5% FER with 95% confidence. For the purpose of compliance with the TIA/EIA/-98E standard and without taking into account the false alarm rate, N can be any value and only X' need be determined for the test.

An alternate embodiment using variable N can also be used. To determine N, after the determined settling time of the test Ior, a continuous series of individual correlated energy samples are taken. The mean of N adjacent samples is calculated and plotted. The exemplary results for a device under test are shown in FIGS. 7A to 7E for N=5, 10, 20, 40, and 80. These values of N are chosen to simplify the processing of data in the test stage. Each point on the graphs depicted in FIGS. 7A to 7E is the scatter diagram of mean values of N adjacent readings. As N increases, the 95% confidence interval becomes narrower. Using a test limit of FER=0.5%, taken from the plot of N=5 (FIG. 7A), the corresponding correlated energy threshold value is determined to be 1385. Thus, a mean correlated energy above 1385, would indicate an FER<0.5%. It is obviously most desirable to use the lowest value of N to decrease test time i.e. N=5. However, it may not always be possible to determine a pass with N=5, as the false alarm rate may be too high. If a pass is not determined within N=5 samples, then N can be doubled until a maximum value of N=80 is reached. The maximum value of N is determined by the maximum test time allowed in manufacturing and the sampling rate for reading the energy values. If the mean of 80 energy readings is smaller than 1333, a fail is registered.

Figure 9A:
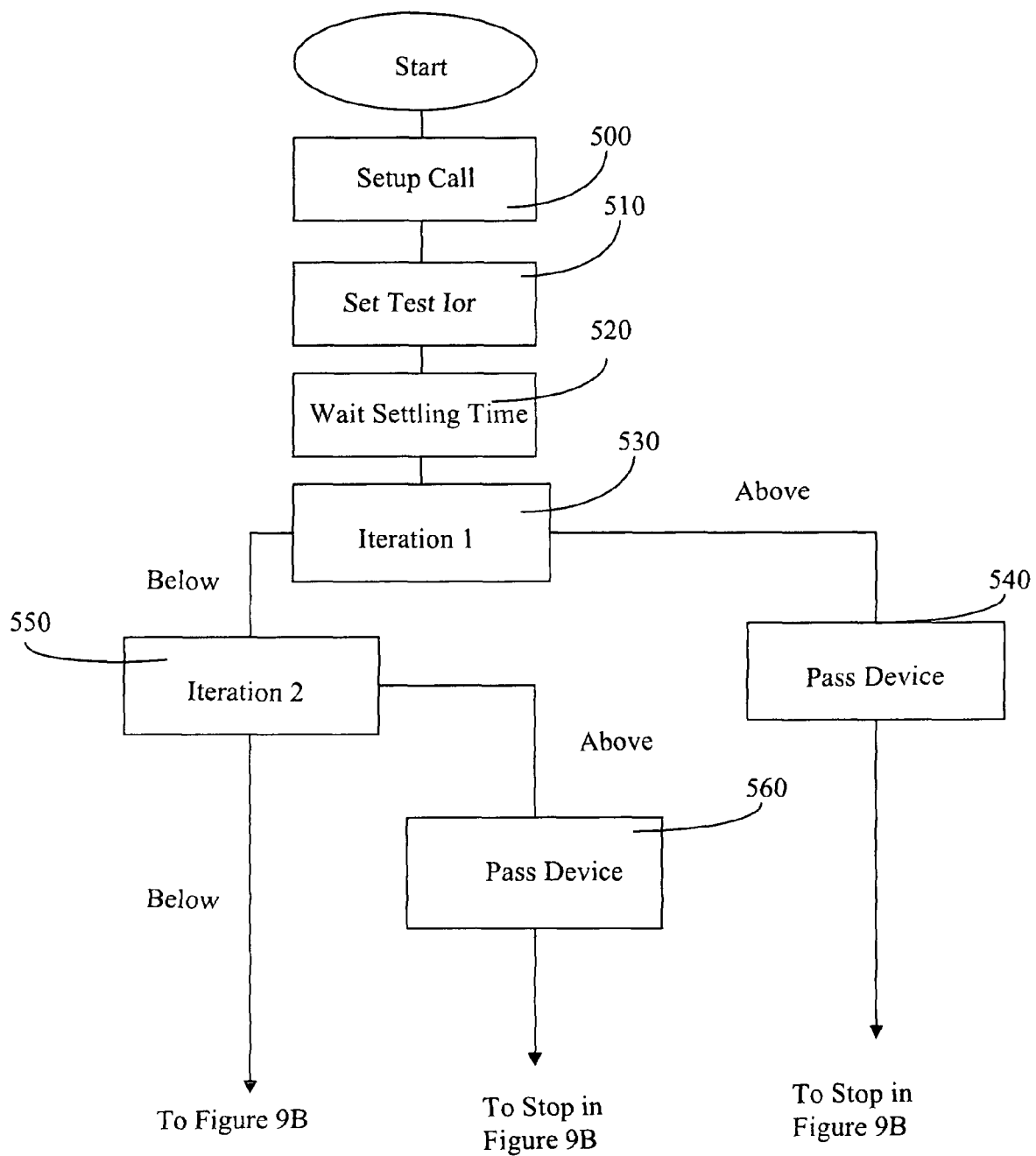
FIGS. 9A and 9B depict the steps for testing a wireless device using correlated energy.
Figure 9B:
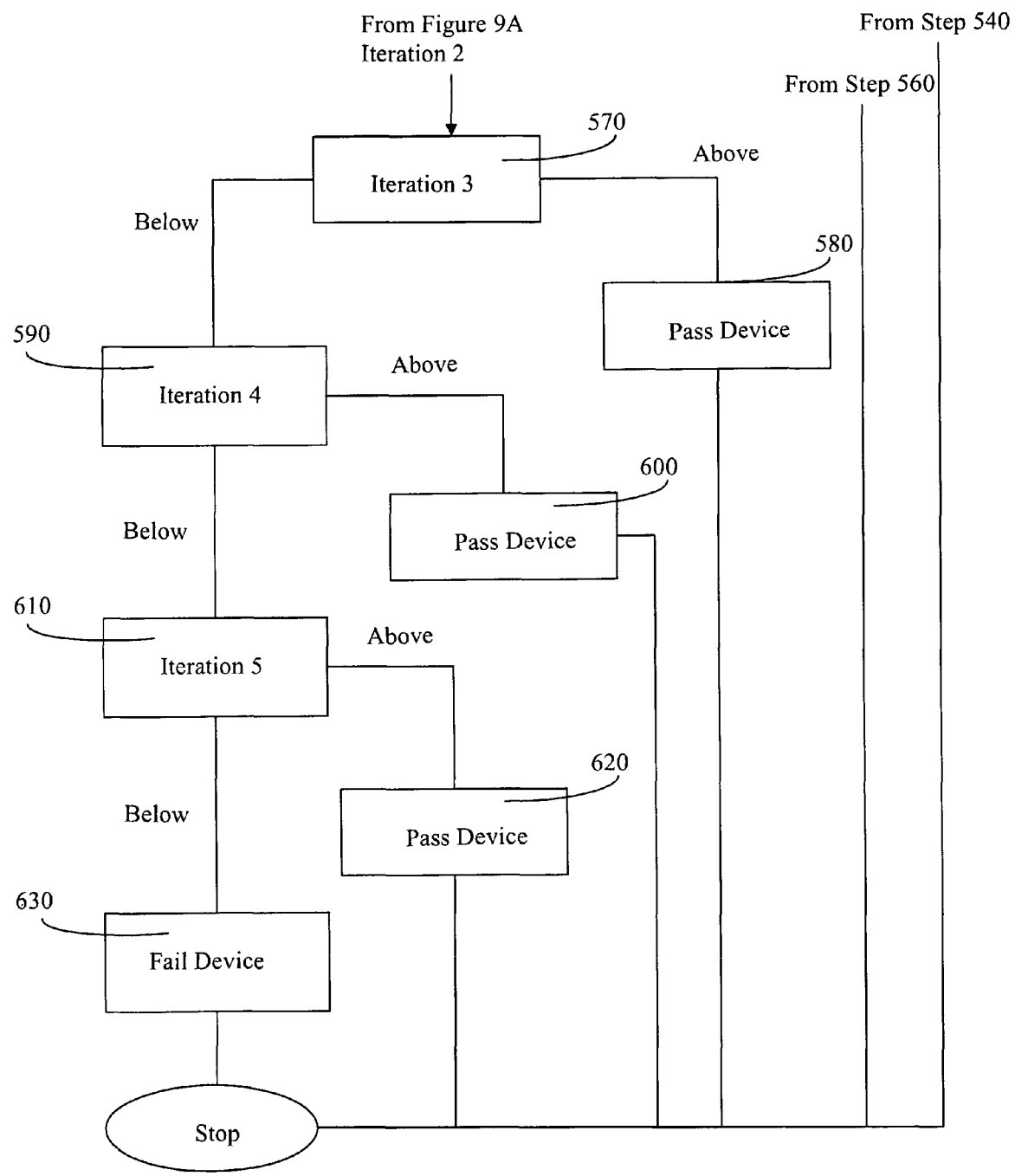

Having completed the characterization step to determine the correlated energy pass/fail thresholds, the actual test of the sample device can be conducted. FIG. 8 depicts a table highlighting the number of correlated energy readings taken over a given time and the associated pass criterion for each iteration of the test for a sample device under test. The pass criterion are derived from FIGS. 7A to 7E. FIGS. 9A and 9B depict a flow chart highlighting the steps in a generic test. In FIG. 9A, at step 500 a test call is setup on the test channel to generate simulated traffic. At step 510, the test Ior is set. At step 520, the tester waits the correlated energy estimator settling time (e.g. 1.5 seconds). At step 530, the first iteration is performed. N samples of correlated energy are taken within, for example, one second (where N is preferably greater than or equal to 5). The average of the N samples is then taken. If the calculated average is greater than the pass criterion established for the number of N samples (see FIGS. 7A and 8) then, at step 540 the device under test is passed. If the calculated average is below the pass criterion, then proceed to iteration two at step 550. In the second iteration, an additional N correlated energy samples are taken and the average of these samples is calculated. The average from the first iteration and the second iteration are added together and divided by two to form an overall average of 2N samples. If the new average is greater than the pass criterion established for the number of 2N samples (see FIGS. 7B and 8) then, at step 560, the device under test is passed. If the calculated average is below the pass criterion, then proceed to iteration three at step 570 in FIG. 9B. The steps associated with second iteration are repeated with 2N additional correlated energy samples and the calculated average is compared to the 4N pass criteria. If the new average is greater than the pass criterion established for the number of 4N samples (see FIGS. 7C and 8) then, at step 580, the device under test is passed. If the calculated average is below the pass criterion, then proceed to iteration four at step 590. 4N additional correlated energy samples are taken and the calculated average is compared to the 8N pass criteria. If the new average is greater than the pass criterion established for the number of 8N samples (see FIGS. 7D and 8) then, at step 600, the device under test is passed. If the calculated average is below the pass criterion, then proceed to iteration five at step 610. 8N additional correlated energy samples are taken and the calculated average is compared to the 16N pass criteria. If the new average is greater than the pass criterion established for the number of 16N samples (see FIGS. 7E and 8) then, at step 620, the device under test is passed. If the calculated average is below the pass criterion, then, at step 630, the device under test is failed and testing begins on another device. Depending on the number of iterations a device has to be tested, some devices may take less time to finish testing than other devices. Overall, the average test time of many devices is significantly reduced. The number of iterations may not have to be five. The test which has been described serves only as an example.

Figure 10:
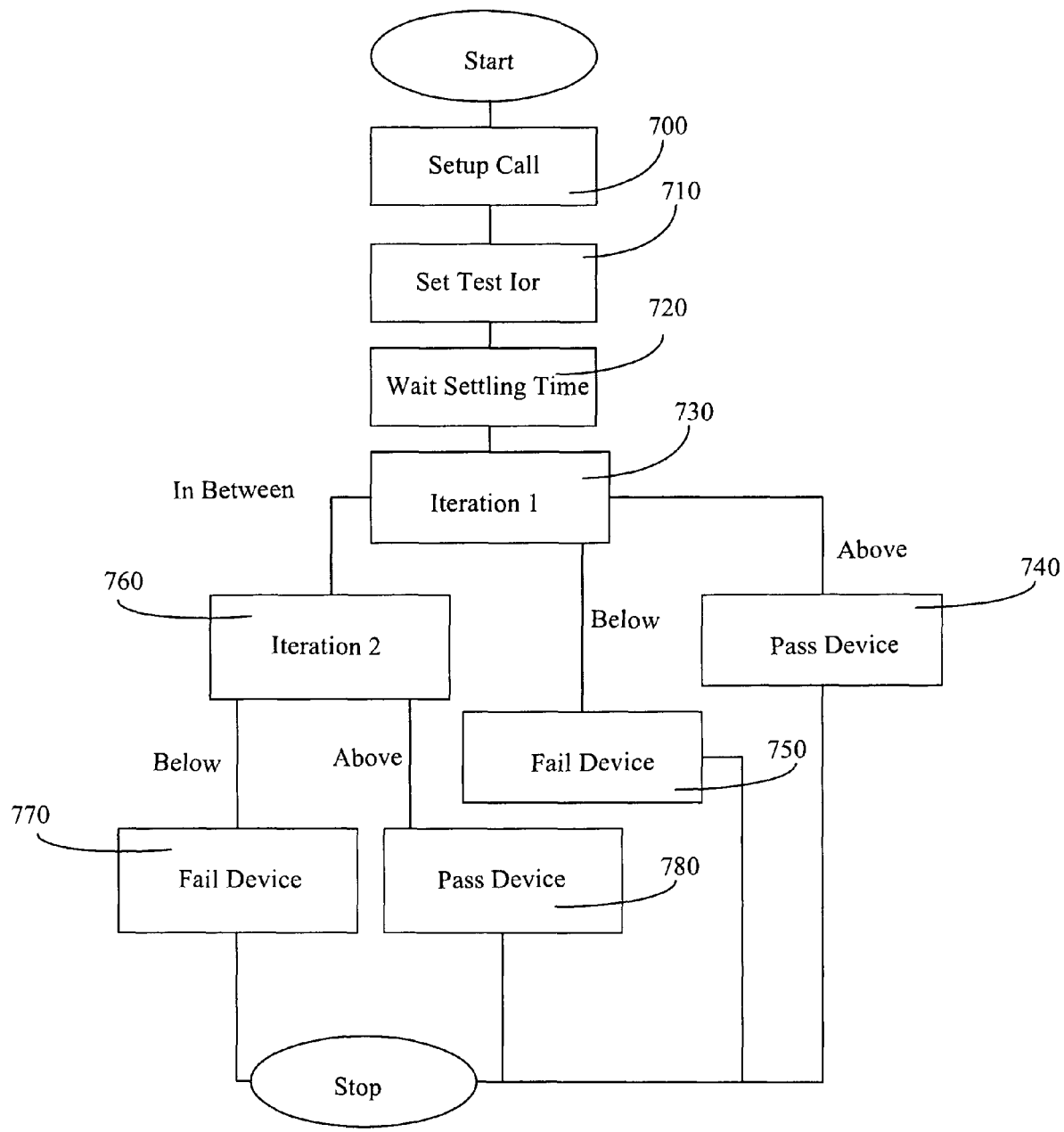
FIG. 10 depicts the steps for an alternate test on a wireless device using correlated energy.

FIG. 10 depicts an alternate test in accordance with the present application. At step 700 a test call is setup on the test channel. At step 710, the test Ior is set. At step 720, the tester waits the correlated energy estimator settling time (e.g. 1.5 seconds). At step 730, the first iteration is performed. N samples of correlated energy are taken within, for example, one second (where N is preferably greater than or equal to 5). The average of the N samples is then taken. If the calculated average is greater than the upper pass criterion established for the number of N samples (see FIG. 7A, upper limit for 0.5% FER and 95% confidence) then, at step 740 the device under test is passed. If the calculated average is below the lower fail criterion (see FIG. 7A, lower limit for 0.5% FER and 95% confidence) then the device under test is failed at step 750. If the calculated average is between the upper and lower limit, then proceed to step 760. In the second iteration, 3N additional correlated energy samples are taken and the average of these samples is calculated. The average from the first iteration is weighted by ¼ and the second iteration is weighted by ¾ and then the two weighted values are added together to form an overall average of 4N samples. If the newly calculated average is less than the 4N fail criteria then, at step 770 the device under test is failed. If the newly calculated average is greater than the 4N pass criteria then, at step 780 the device under test is passed. The described 4N pass criteria represents the 50% confidence midpoint between the upper and lower limits for 95% confidence (see FIG. 7C). Similarly, the test can be performed using a different number of iterations. The test described is only by way of example. As will be appreciated, if the test only allows two possible resulting decisions: Pass or Fail, the threshold has to be the mid point and for some devices the confidence of such decision has to be 50%. Alternately, the pass confidence can be 95% and the fail confidence can be as low as 5%, in which case the threshold used is the upper 95% point. In yet another embodiment, the resulting decision can be one of three: Pass, Fail or Uncertain, in which case to determine a device "Pass", the average must be higher than the upper 95% point, to determine a device "Fail" the average must be lower than the lower 95% point, and to determine a device "Uncertain", the average must be between the upper and lower 95% thresholds. In this case, both "Pass" and "Fail" decisions have a confidence of 95%.

As will be appreciated by those in the art, the wireless communications test set which simulates base station 120 may be hard wired directly to the DUT via coaxial cable to an RF connector or the coaxial cable could be hard wired to a transmitting antenna or a radiating coupler located within a shielded box or an RF anechoic chamber where DUT 330 is also located. DUT 330 may be simply a printed circuit board integral to a wireless device with the sensitivity test being conducted by feeding a test signal into an antenna port integral to the printed circuit board. It will also be appreciated that path loss introduced by the coaxial cables and/or antenna/couplers/propagation involved in the test set up is accounted for in the tests when setting the Ior value.

Figure 1:
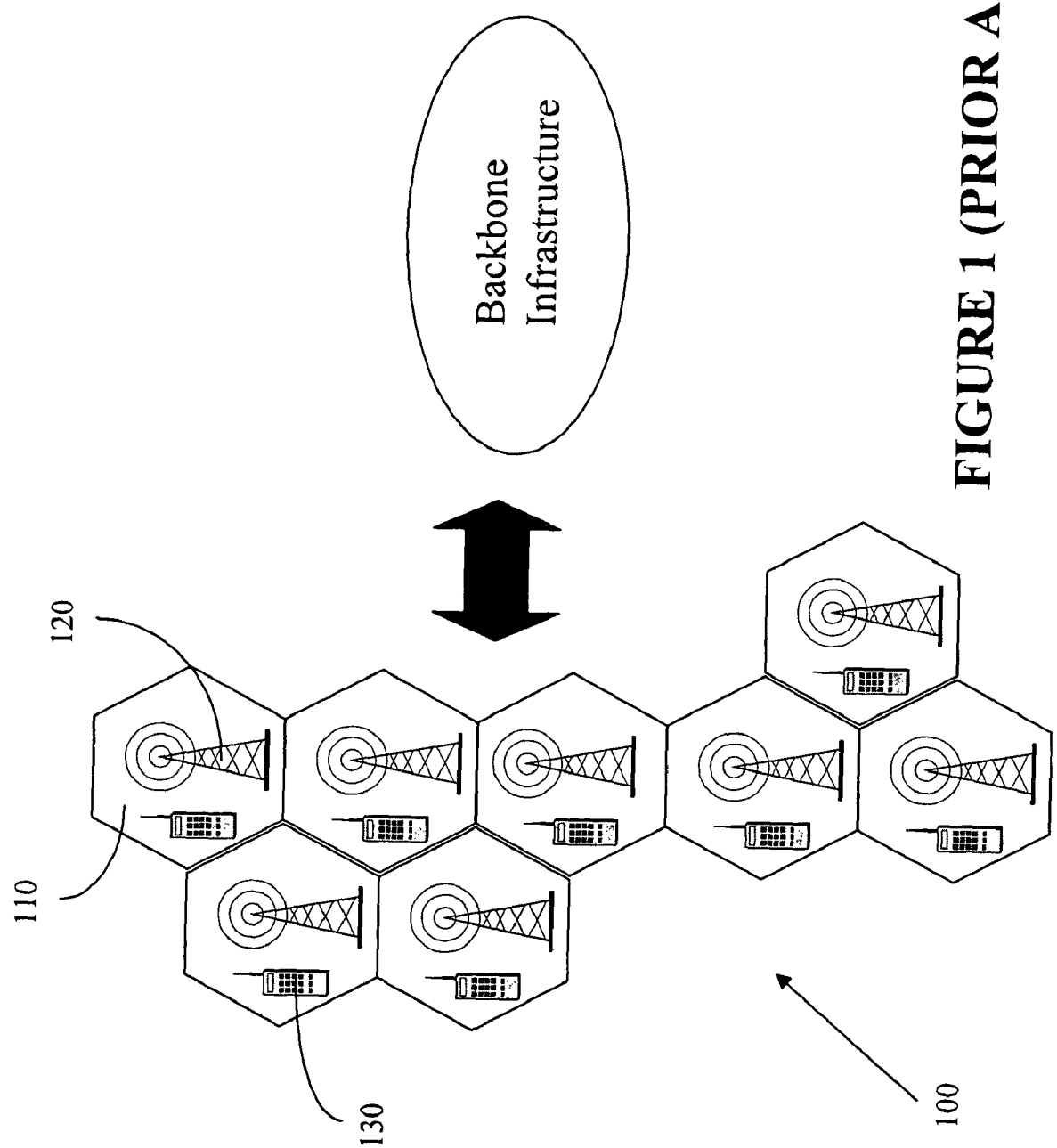
FIG. 1 depicts a typical mobile communication system.
Figure 2:
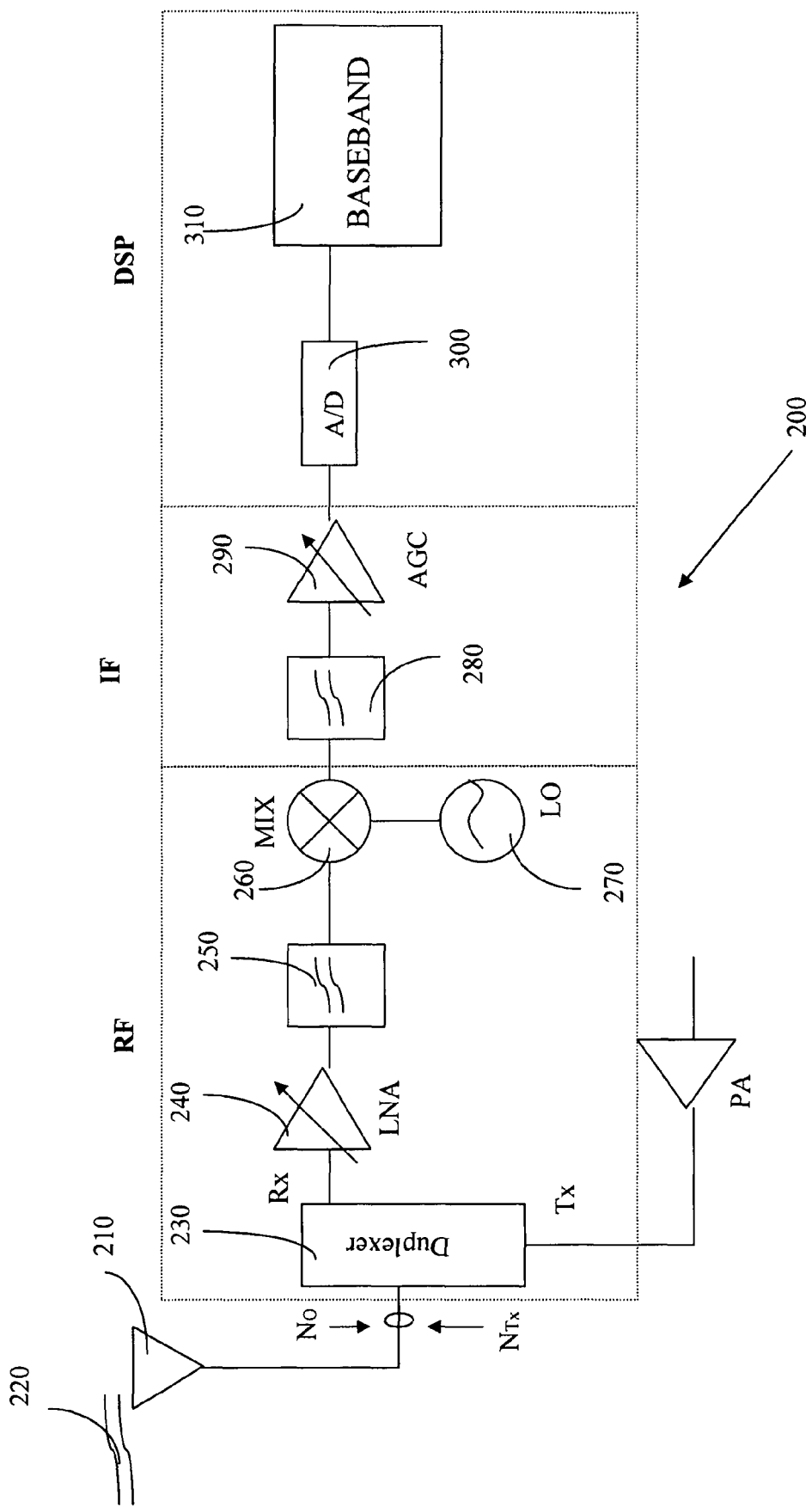
FIG. 2 depicts a representative receiver block diagram for a wireless device.

Although various exemplary embodiments of the invention have been disclosed, it should be apparent to those skilled in the art that various changes and modifications can be made which will achieve some of the advantages of the improved testing methodology without departing from the true scope of the application. More specifically, any physical quantity obtained in the baseband processing which has a monotonic relationship with signal to interference ratio can be used to conduct the receiver sensitivity test e.g. symbol error rate (SER), bit error rate (BER), carrier power to noise density ratio (C/No), energy per symbol to interference density ratio (Es/Io), energy per bit to interference density ratio (Eb/Io), energy per chip to noise density ratio (Ec/No), energy per bit to noise density ratio (Eb/No), energy per symbol to noise density ratio (Es/No) etc. Also, the measurement replaced by a physical quantity (e.g. signal to interference ratio or correlated energy) in a test may not have to be FER. Other examples include packet error rate (PER) or BER after forward error correction. All such alternate embodiments are meant to be included within the scope of the invention. Additionally, the air interface is not limited to cdma2000. There are other examples including UMTS, GSM/GPRS, 802.11, etc to which the present invention can be applied. Finally, this test had been described in relation to a mobile device. The test is more universally applicable to any RF communication device where receiver sensitivity testing is required (e.g. for base station 120 in FIG. 1) where a relationship between the existing test parameter and correlated energy or SNR can be determined to establish new thresholds against which the receiver's sensitivity can be evaluated.

A person understanding this invention may now conceive of alternative structures and embodiments or variations of the above all of which are intended to fall within the scope of the invention as defined in the claims that follow.

We claim:

1. A method of conducting a receiver sensitivity test of a radio frequency (RF) device, said method comprising:
   waiting a defined settling time;
   forwarding a simulated traffic signal to said RF device;
   obtaining N samples at a baseband processor associated with said RF device of a new test quantity of said simulated traffic signal, wherein said new test quantity has a predetermined and monotonic relationship with a known receiver sensitivity test parameter of a defined test standard;
   calculating an average of said N samples; and
   comparing said calculated average with new test criteria for said new test quantity which corresponds to a pass/fail criteria of said defined test standard for said known receiver sensitivity test parameter, wherein said new test criteria achieves a defined missed detection rate and a defined false alarm rate.

2. A method according to claim 1 wherein said new test criteria comprises a specified new test quantity threshold defined for N samples of said new test quantity, and wherein said specified new test quantity threshold corresponds to a performance threshold and a defined confidence level for said known receiver sensitivity test parameter according to said pass/fail criteria of said defined test standard.

3. A method according to claim 1 wherein said new test quantity is taken from the group comprising signal to noise ratio, signal to interference ratio, energy per chip to interference density ratio (Ec/Io), energy per bit to interference density ratio (Eb/Io), energy per symbol to interference density ratio (Es/Io), energy per chip to noise density ratio (Ec/No), energy per bit to noise density ration (Eb/No), energy per symbol to noise density ratio (Es/No), carrier power to noise density ratio (C/No), correlated energy, correlated amplitude, symbol error rate and bit error rate.

4. A method according to claim 1 wherein said known receiver sensitivity test parameter is taken from the group comprising frame error rate (FER), packet error rate (PER), and symbol error rate (SER).

5. A method according to claim 2 wherein comparing said calculated average with new test criteria comprises determining if said calculated average is greater than said specified new test quantity threshold.

6. A method of conducting a receiver sensitivity test of a radio frequency (RF) device, said method comprising:
   waiting a defined settling time;
   forwarding a simulated traffic signal to said RF device;
   performing at least one iteration of a predefined number of iterations of testing wherein each iteration of testing comprises:
      obtaining a multiple, determined by a current iteration, of N samples at a baseband processor associated with said RF device of a new test quantity of said simulated traffic signal, wherein said new test quantity has a predetermined and monotonic relationship with a known receiver sensitivity test parameter of a defined test standard;
      calculating a current average of said new test quantity from a current total number of samples obtained during said receiver sensitivity test up to and including said current iteration; and
      determining said RF device has passed said receiver sensitivity test and that no further iterations are to be performed in a case where said calculated current average is greater than a specified new test quantity threshold, wherein said specified new test quantity threshold is defined for a number of samples corresponding to said current total number of samples obtained and corresponds to a performance threshold and a defined confidence level for said known receiver sensitivity test parameter according to a pass/fail criteria of said defined test standard; and
      determining that another iteration is to be performed in a case where said calculated current average is less than said specified new test quantity threshold;
   determining said RF device has failed in a case where after said predefined number of iterations said RF device has not been determined to have passed said receiver sensitivity test.

7. A method of conducting a receiver sensitivity test of a radio frequency (RF) device, said method comprising:
   waiting a defined settling time;
   forwarding a simulated traffic signal to said RF device;
   performing at least one iteration of a predefined number of iterations of testing wherein each iteration of testing comprises:
      obtaining a multiple, determined by a current iteration, of N samples at a baseband processor associated with said RF device of a new test quantity of said simulated traffic signal, wherein said new test quantity has a predetermined and monotonic relationship with a known receiver sensitivity test parameter of a defined test standard;
      calculating a current average of said new test quantity from a current total number of samples obtained during said receiver sensitivity test up to and including said current iteration;
      determining said RF device has passed said receiver sensitivity test and that no further iterations are to be performed in a case where said calculated current average is greater than a specified new test quantity upper threshold, wherein said specified new test quantity upper threshold is defined for a number of samples corresponding to said current total number of samples obtained and corresponds to an upper limit for a performance threshold and a defined confidence level for said known receiver sensitivity test parameter according to a pass/fail criteria of said defined test standard; and determining said RF device has failed said receiver sensitivity test and that no further iterations are to be performed in a case where said calculated current average is less than a specified new test quantity lower threshold, wherein said specified new test quantity lower threshold is defined for a number of samples corresponding to said current total number of samples obtained and corresponds to a lower limit of a performance threshold and a defined confidence level for said known receiver sensitivity test parameter according to said pass/fail criteria of said defined test standard;

determining that another iteration is to be performed in a case where said calculated current average is less than said specified new test quantity upper threshold and greater than said specified new test quantity lower threshold;

determining said RF device has failed in a case where after said predefined number of iterations said RF device has not been determined to have passed said receiver sensitivity test.

8. A method according to claim 1 wherein said defined standard is TIA/EIA/-98E, and wherein a specified new test quantity threshold of said new test criteria corresponds to a forward error rate (FER) less than or equal to 0.5% with 95% confidence.

9. A method according to claim 8 wherein said known receiver sensitivity test parameter is frame error rate and said new test quantity is correlated energy.

10. A method according to claim 6 wherein said known receiver sensitivity test parameter is frame error rate and said new test quantity is correlated energy.

11. A method according to claim 7 wherein said known receiver sensitivity test parameter is frame error rate and said new test quantity is correlated energy.

12. A method according to claim 6 wherein said known receiver sensitivity test parameter is frame error rate and said new test quantity is signal to noise ratio (SNR) or Ec/Io.

13. A method according to claim 7 wherein said known receiver sensitivity test parameter is frame error rate and said new test quantity is signal to noise ratio (SNR) or Ec/Io.

14. A method according to claim 6 wherein said known receiver sensitivity test parameter is symbol error rate and said new test quantity is Ec/Io.

15. A method according to claim 7 wherein said known receiver sensitivity test parameter is symbol error rate and said new test quantity is Ec/Io.

16. A method according to claim 1 wherein said known receiver test parameter is bit error rate (BER) after forward error correction.

17. A system for conducting a receiver sensitivity test of a radio frequency (RF) device under test (DUT), the system comprising:

said DUT being a base station operating within a wireless network, said DUT having a baseband processor and for obtaining N samples at said baseband processor of a new test quantity of a simulated traffic signal, wherein said new test quantity has a predetermined and monotonic relationship with a known receiver sensitivity test parameter of a defined test standard; and a wireless communications test set for forwarding said simulated traffic signal to said DUT, for receiving and calculating an average of said N samples; and for comparing said calculated average with new test criteria for said new test quantity which corresponds to a pass/fail criteria of said defined test standard for said known receiver sensitivity test parameter.

18. A system according to claim 17 wherein said DUT is a wireless device operating within a wireless network.

19. A system according to claim 17 wherein said known receiver test parameter is bit error rate (BER) after forward error correction.

20. A system according to claim 17 wherein said baseband processor further includes a function for translating a correlated energy value derived from said estimated amplitude, to a signal to noise ratio (SNR) or Ec/Io.

21. A system according to claim 17 wherein said new test criteria comprises a specified new test quantity threshold defined for N samples of said new test quantity, and wherein said specified new test quantity threshold corresponds to a performance threshold and a defined confidence level for said known receiver sensitivity test parameter according to said pass/fail criteria of said defined test standard.

22. A system according to claim 17 wherein said new test quantity is taken from the group comprising signal to noise ratio, signal to interference ratio, energy per chip to interference density ratio (Ec/Io), energy per bit to interference density ratio (Eb/Io), energy per symbol to interference density ratio (Es/Io), energy per chip to noise density ratio (Ec/No), energy per bit to noise density ration (Eb/No), energy per symbol to noise density ratio (Es/No), carrier power to noise density ratio (C/No), correlated energy, correlated amplitude, symbol error rate and bit error rate.

23. A system according to claim 17 wherein said known receiver sensitivity test parameter is taken from the group comprising frame error rate (FER), packet error rate (PER), and symbol error rate (SER).

24. A system according to claim 21 wherein said wireless communications test set's comparing said calculated average with new test criteria comprises determining if said calculated average is greater than said specified new test quantity threshold.

25. A system for conducting a receiver sensitivity test of a radio frequency (RF) device under test (DUT), the system comprising:

said DUT having a baseband processor and for obtaining samples at said baseband processor of a new test quantity of a simulated traffic signal, wherein said new test quantity has a predetermined and monotonic relationship with a known receiver sensitivity test parameter of a defined test standard; and a wireless communications test set for forwarding said simulated traffic signal to said DUT, for receiving and calculating averages of said samples, wherein said DUT and said wireless communications test set are for performing at least one iteration of a predefined number of iterations of testing wherein each iteration of testing comprises:

said DUT obtaining a multiple, determined by a current iteration, of N samples at said baseband processor of said new test quantity of said simulated traffic signal;

said wireless communications test set receiving from said DUT said multiple of N samples and calculating a current average of said new test quantity from a current total number of samples obtained during said receiver sensitivity test up to and including said current iteration, determining said DUT has passed said receiver sensitivity test and that no further iterations are to be performed in a case where said calculated current average is greater than a specified new test quantity threshold, wherein said specified new test quantity threshold is defined for a number of samples corresponding to said current total number of samples obtained and corresponds to a performance threshold and a defined confidence level for said known receiver sensitivity test parameter according to a pass/fail criteria of said defined test standard, and determining that another iteration is to be performed in a case where said calculated current average is less than said specified new test quantity threshold, and, wherein said wireless communications test set is further for determining that said DUT has failed in a case where after said predefined number of iterations said DUT has not been determined to have passed said receiver sensitivity test.

26. A system for conducting a receiver sensitivity test of a radio frequency (RF) device under test (DUT), the system comprising:

said DUT having a baseband processor and for obtaining samples at said baseband processor of a new test quantity of a simulated traffic signal, wherein said new test quantity has a predetermined and monotonic relationship with a known receiver sensitivity test parameter of a defined test standard; and a wireless communications test set for forwarding said simulated traffic signal to said DUT, for receiving and calculating averages of said samples, wherein said DUT and said wireless communications test set are for performing at least one iteration of a predefined number of iterations of testing wherein each iteration of testing comprises:

said DUT obtaining a multiple, determined by a current iteration, of N samples at said baseband processor of said new test quantity of said simulated traffic signal;

said wireless communications test set receiving from said DUT said multiple of N samples and calculating a current average of said new test quantity from a current total number of samples obtained during said receiver sensitivity test up to and including said current iteration, determining said DUT has passed said receiver sensitivity test and that no further iterations are to be performed in a case where said calculated current average is greater than a specified new test quantity upper threshold, wherein said specified new test quantity upper threshold is defined for a number of samples corresponding to said current total number of samples obtained and corresponds to an upper limit for a performance threshold and a defined confidence level for said known receiver sensitivity test parameter according to a pass/fail criteria of said defined test standard, determining said DUT has failed said receiver sensitivity test and that no further iterations are to be performed in a case where said calculated current average is less than a specified new test quantity lower threshold, wherein said specified new test quantity lower threshold is defined for a number of samples corresponding to said current total number of samples obtained and corresponds to a lower limit of a performance threshold and a defined confidence level for said known receiver sensitivity test parameter according to said pass/fail criteria of said defined test standard, and determining that another iteration is to be performed in a case where said calculated current average is less than said specified new test quantity upper threshold and greater than said specified new test quantity lower threshold, wherein said wireless communications test set is further for determining said DUT has failed in a case where after said predefined number of iterations said DUT has not been determined to have passed said receiver sensitivity test.

27. A system according to claim 17 wherein said defined standard is TIA/EIA/-98E, and wherein a specified new test quantity threshold of said new test criteria corresponds to a forward error rate (FER) less than or equal to 0.5% with 95% confidence.

28. A system according to claim 27 wherein said known receiver sensitivity test parameter is frame error rate and said new test quantity is correlated energy.

29. A system according to claim 25 wherein said known receiver sensitivity test parameter is frame error rate and said new test quantity is correlated energy.

30. A system according to claim 26 wherein said known receiver sensitivity test parameter is frame error rate and said new test quantity is correlated energy.

31. A system according to claim 25 wherein said known receiver sensitivity test parameter is frame error rate and said new test quantity is signal to noise ratio (SNR) or Ec/Io.

32. A system according to claim 26 wherein said known receiver sensitivity test parameter is frame error rate and said new test quantity is signal to noise ratio (SNR) or Ec/Io.

33. A system according to claim 25 wherein said known receiver sensitivity test parameter is symbol error rate and said new test quantity is Ec/Io.

34. A system according to claim 26 wherein said known receiver sensitivity test parameter is symbol error rate and said new test quantity is Ec/Io.

35. A system according to claim 17 wherein said new test criteria achieves a defined missed detection rate and a defined false alarm rate.

* * * * *